(12) United States Patent
Miller

(10) Patent No.: US 8,292,355 B2
(45) Date of Patent: Oct. 23, 2012

(54) VEHICLE ROOF WITH RETRACTABLE WINDSHIELD

(76) Inventor: Michael C. Miller, Port Barre, LA (US)

( * ) Notice: Subject to any disclaimer, the term of this patent is extended or adjusted under 35 U.S.C. 154(b) by 0 days.

(21) Appl. No.: 13/282,185

(22) Filed: Oct. 26, 2011

(65) Prior Publication Data

US 2012/0098290 A1   Apr. 26, 2012

Related U.S. Application Data

(60) Provisional application No. 61/406,606, filed on Oct. 26, 2010.

(51) Int. Cl.
*B60J 1/04* (2006.01)

(52) U.S. Cl. .............. 296/201; 296/190.1; 296/96.2; 296/210

(58) Field of Classification Search .......... 296/190.1, 296/201, 86, 87, 88, 92, 96, 96.2, 96.21, 296/210
See application file for complete search history.

(56) References Cited

U.S. PATENT DOCUMENTS

| | | | |
|---|---|---|---|
| 798,447 A | 8/1905 | Pfleghar | |
| 2,570,399 A | 10/1951 | Smith | |
| 3,992,816 A | 11/1976 | Skahill | |
| 4,072,338 A | 2/1978 | Lawrence et al. | |
| 4,792,175 A * | 12/1988 | Gerber | 296/79 |
| 4,795,205 A | 1/1989 | Gerber | |
| 5,362,118 A | 11/1994 | Houriez | |
| 5,921,611 A | 7/1999 | Townsend | |
| 6,302,440 B1 | 10/2001 | Goodstein | |
| 6,336,674 B1 * | 1/2002 | Gerisch et al. | 296/146.16 |
| 7,144,061 B1 | 12/2006 | Behm et al. | |
| 7,390,051 B2 | 6/2008 | Bruntz et al. | |
| 7,845,711 B2 * | 12/2010 | Orrell et al. | 296/190.03 |
| 2006/0202501 A1 | 9/2006 | Tadakamalla | |
| 2009/0026803 A1 * | 1/2009 | Yano et al. | 296/190.1 |
| 2010/0283290 A1 * | 11/2010 | Akahane et al. | 296/190.1 |

FOREIGN PATENT DOCUMENTS

| | | |
|---|---|---|
| EP | 1 369 276 A1 | 12/2003 |
| FR | 2 827 226 A1 | 1/2003 |
| WO | WO 2007/017791 A1 | 2/2007 |

* cited by examiner

*Primary Examiner* — Jason S Morrow
(74) *Attorney, Agent, or Firm* — Richard C. Litman

(57) ABSTRACT

The vehicle roof with a retractable windshield provides a retractable windshield for vehicles, such as UTVs, golf carts and the like, which typically do not include a windshield. The vehicle roof with a retractable windshield includes a roof base adapted for mounting on the vehicle in place of the conventional single panel roof. A cover is also provided, with the cover being adapted for mounting on the roof base so that a storage compartment is defined therebetween. A rear edge of the cover is pivotally secured to a rear edge of the roof base by hinges or the like. A windshield having a support frame with opposed upper and lower edges is removably and slidably disposed within the storage compartment defined between the cover and the roof base.

20 Claims, 6 Drawing Sheets

VEHICLE ROOF WITH RETRACTABLE WINDSHIELD

CROSS-REFERENCE TO RELATED APPLICATION

This application claims the benefit of U.S. Provisional Patent Application Ser. No. 61/406,606, filed Oct. 26, 2010.

BACKGROUND OF THE INVENTION

1. Field of the Invention

The present invention relates to vehicle windshields, and particularly to a vehicle roof with a retractable windshield adapted for use with utility task vehicles (UTVs, also referred to as Utility Terrain Vehicles, Utility Type Vehicles, or simply Utility Vehicles)), golf carts, construction vehicles and the like.

2. Description of the Related Art

Utility task vehicles (UTVs), golf carts, construction vehicles and the like are typically provided without windshields. With the growing popularity of such vehicles, particularly UTVs, the vehicles are being used in a broader range of environments, some of which require the addition of a windshield, windscreen or the like. Although vehicles with removable and adjustable windshields and windscreens are known, such arrangements are typically either mechanically complex or automated, neither of which may be readily applied to the relatively simple structures of UTVs, golf carts and the like.

Thus, a vehicle roof with a retractable windshield solving the aforementioned problems is desired.

SUMMARY OF THE INVENTION

The vehicle roof with a retractable windshield provides a retractable windshield for such vehicles as utility task vehicles (UTVs), golf carts and the like, which typically do not include a windshield. The vehicle roof with a retractable windshield includes a roof base adapted for mounting on the vehicle in place of the conventional single panel roof. A cover is also provided, the cover being adapted for mounting on the roof base so that a storage compartment is defined therebetween. A rear edge of the cover is pivotally secured to a rear edge of the roof base by hinges or the like.

A windshield having a support frame with opposed upper and lower edges is removably and slidably received within the storage compartment defined between the cover and the roof base. In use, the user manually raises the cover with respect to the roof base. The cover is preferably selectively supported in the open position by at least one pneumatic cylinder or the like. In this open position, the frame and the windshield may be slid out from the storage compartment, the windshield frame being supported by a front frame of the vehicle, which is typically defined by front roll bars or the like.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The vehicle roof with a retractable windshield 10 provides a retractable windshield 16 for vehicles, such as utility task vehicles (UTVs), golf carts and the like, which do not typically include a windshield. It should be understood that the UTV 12 is shown in FIGS. 1 and 2 for exemplary purposes only, and that the vehicle roof with a retractable windshield 10 may be used on any suitable type of vehicle.

Figure 1:
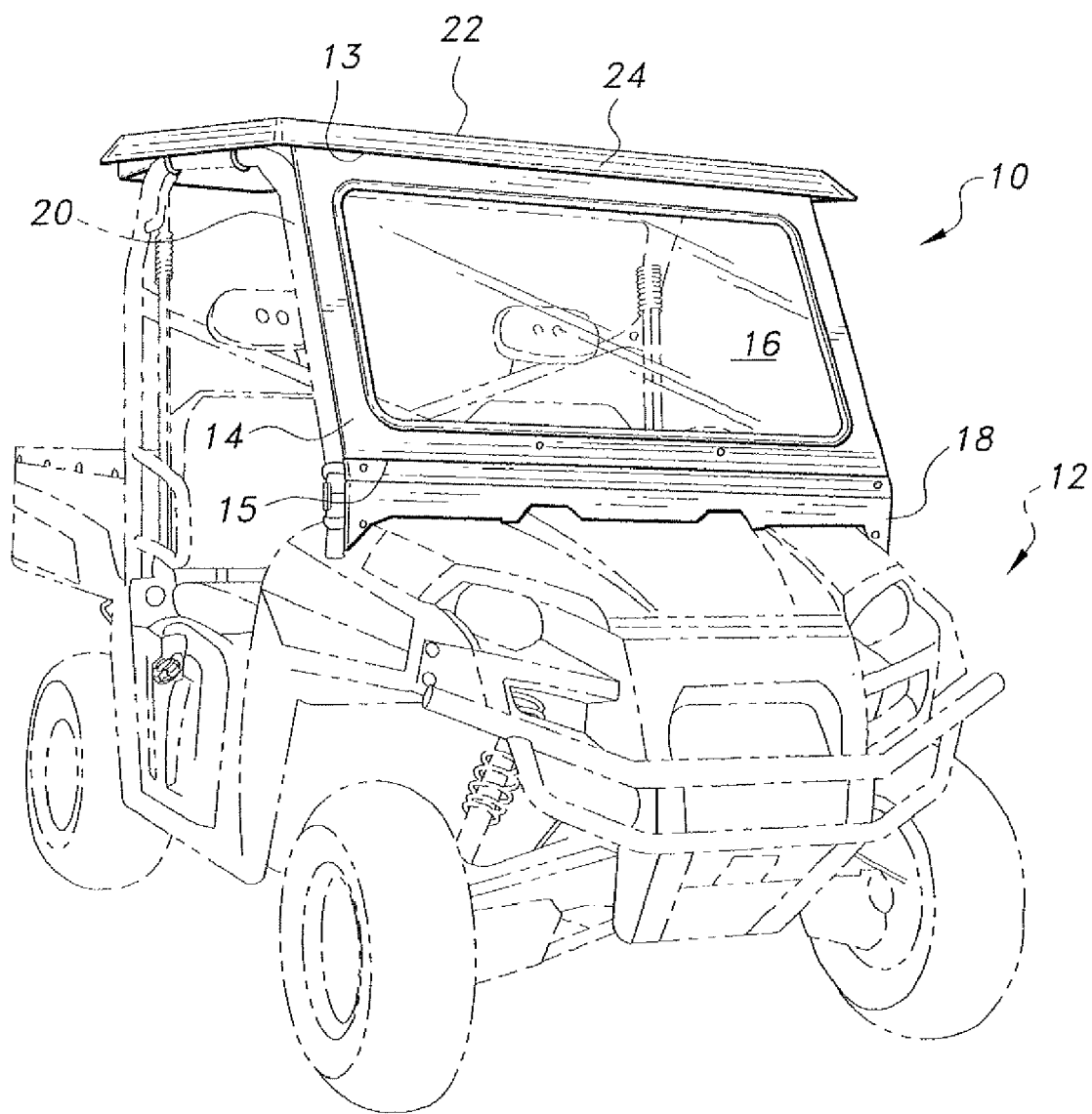
FIG. 1 is an environmental, perspective view of a vehicle roof with a retractable windshield according to the present invention, the retractable windshield being shown in a fully deployed position.
Figure 2:
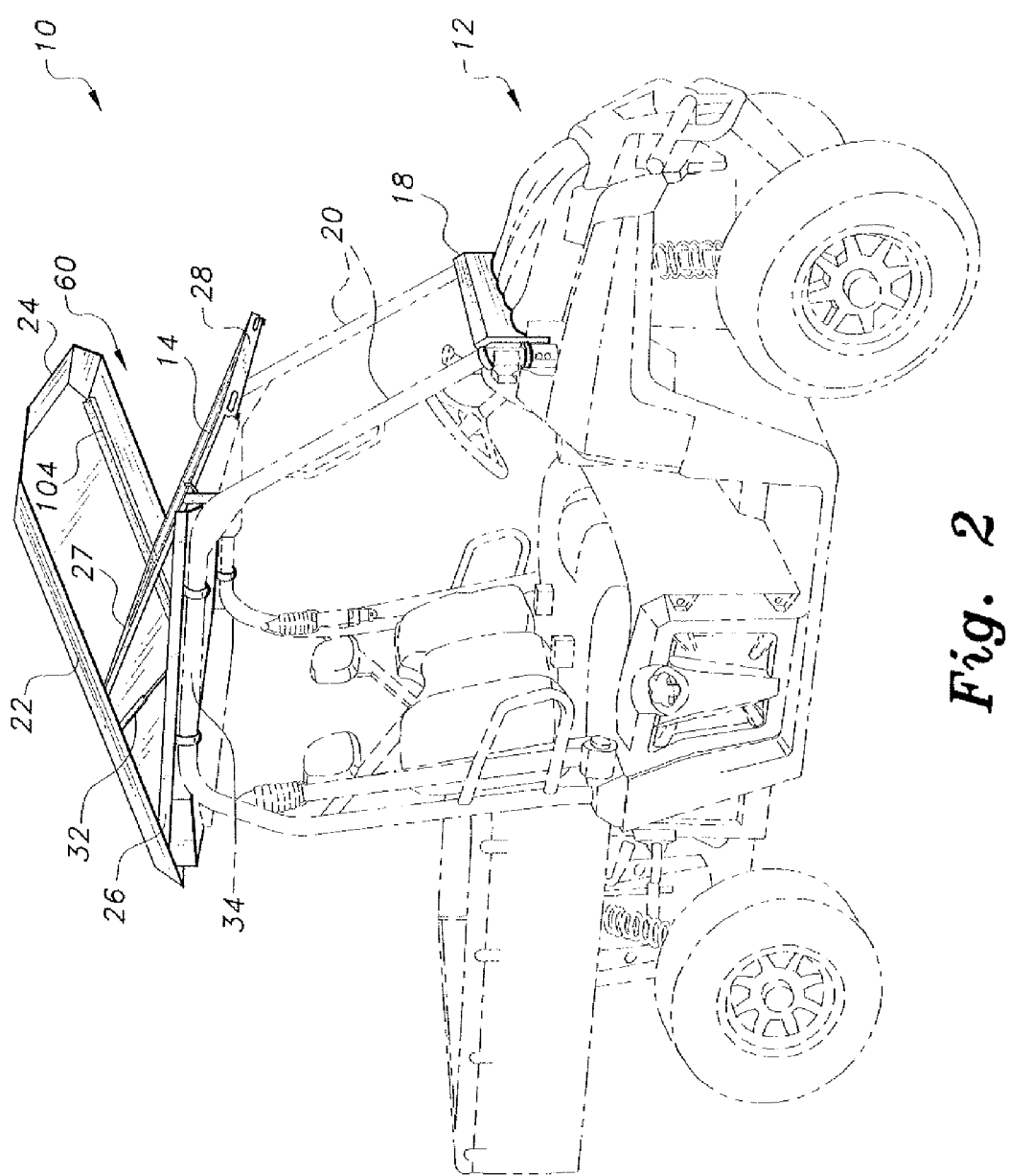
FIG. 2 is an environmental, perspective view of the vehicle roof with a retractable windshield according to the present invention, shown with the windshield in the process of being deployed.
Figure 3:
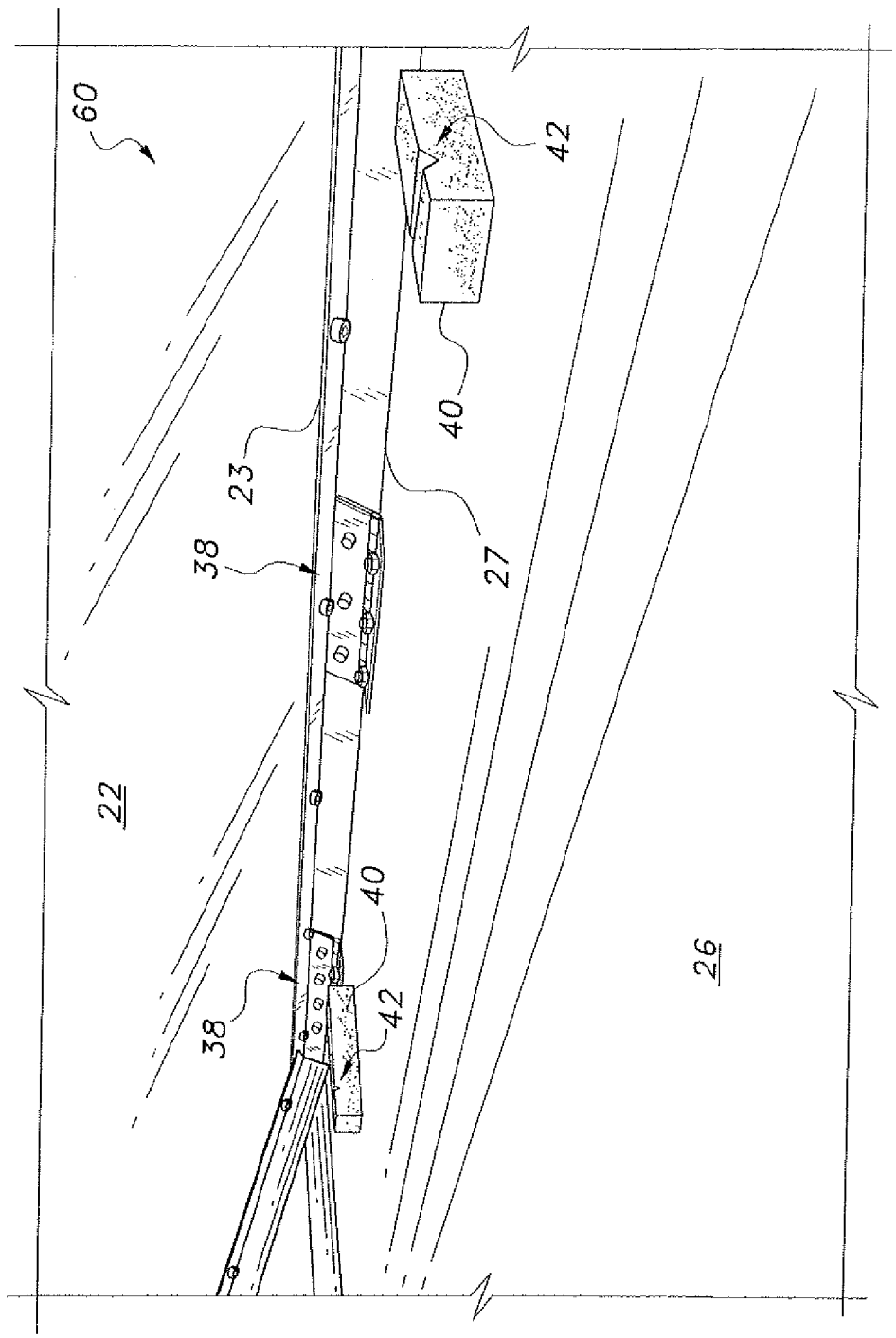
FIG. 3 is a partial perspective view of the interior of a roof compartment of the vehicle roof with a retractable windshield according to the present invention.

As best shown in FIGS. 1 and 2, the vehicle roof with a retractable windshield 10 includes a roof base 26 adapted for mounting on the vehicle 12 where a conventional single panel roof would be attached (shown in the example of FIGS. 1 and 2 as being mounted on upper roll bars 34). A cover 22 is also provided, with the cover 22 being adapted for mounting on the roof base 26 so that a storage compartment 60 is defined therebetween. As best shown in FIG. 3, a rear edge 23 of the cover 22 is pivotally secured to a rear edge 27 of the roof base 26 by hinges 38 or the like. It should be understood that the overall dimensions and configuration of the roof base 26 and cover 22 ultimately depend upon the particular vehicle 12 to which the vehicle roof with a retractable windshield 10 is applied.

A windshield 16 having an outer support frame 14 with opposed upper and lower edges 13, 15, respectively, is removably and slidably disposed within the storage compartment 60 defined between the cover 22 and the roof base 26. It should be understood that the overall dimensions and configuration of the windshield 16 and the windshield frame 14 ultimately depend upon the particular vehicle 12 to which the vehicle roof with a retractable windshield 10 is applied.

Figure 4:
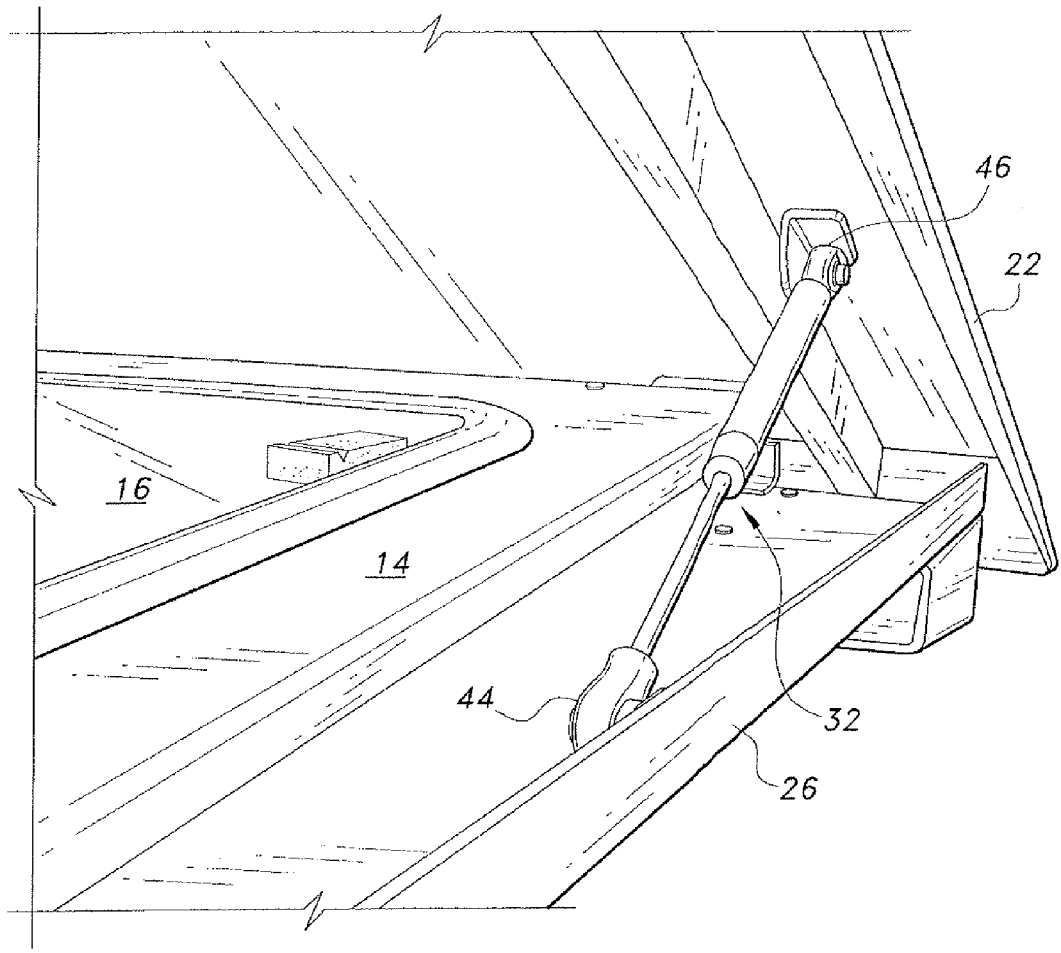
FIG. 4 is a partial perspective view of the interior of the roof compartment of FIG. 3, shown with the retractable windshield in a stowed position.

In use, in order to deploy the windshield 16, the user manually raises the cover 22 with respect to the roof base 26. As best shown in FIGS. 2 and 4, the cover 22 is preferably selectively supported in the open position by at least one pneumatic cylinder 32 or the like. In this open position, the frame 14 and the windshield 16 may be slid out from the storage compartment 60, the windshield frame 14 being supported by a front frame of the vehicle 12, which is typically defined by front roll bars 20 or the like.

Preferably, as shown in FIG. 4, the at least one pneumatic cylinder 32 is pivotally attached at its opposite ends to the lower surface of the cover 22 and to the upper surface of the roof base 26, respectively. It should be understood that pivotal joints 44, 46 are shown in FIG. 4 for exemplary purposes only, and that the at least one pneumatic cylinder 32 may be pivotally secured to the lower surface of the cover 22 and to the upper surface of the roof base 26 by any suitable type of pivotal attachment. Although a pair of pneumatic cylinders 32 are shown positioned adjacent opposed lateral edges of the cover 22 and roof base 26, it should be understood that any suitable number of pneumatic cylinders 32, or any other suitable type of holders or supports, may be utilized.

Further, as shown in FIG. 2, at least one roller 52 is preferably rotatably mounted to the upper edge 13 of the windshield frame 14 for selective rolling engagement with the lower surface of the cover 22 when the windshield 16 is being deployed or stowed. Preferably, a pair of rollers 52 are provided. Each roller 52 is rotatably mounted on one end of upper edge 13 of the windshield frame 14. It should be understood that any suitable type of roller or wheel may be utilized. As further shown in FIG. 2, a pair of side tracks 104 are preferably provided on the underside of cover 22 for guiding rollers 52.

Figure 5:
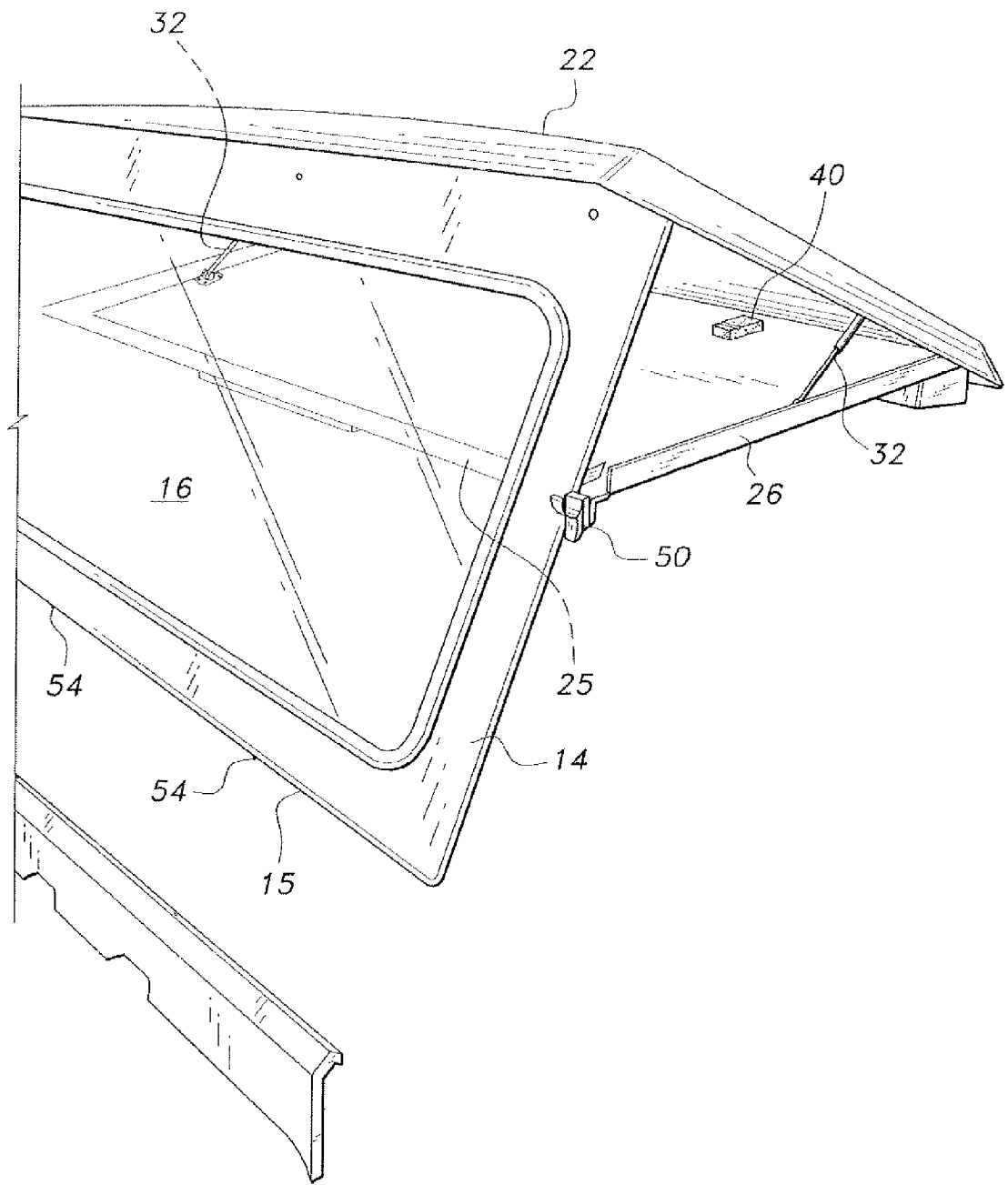
FIG. 5 is a perspective view of the vehicle roof with a retractable windshield according to the present invention, shown with the retractable windshield in a partially deployed position.
Figure 6:
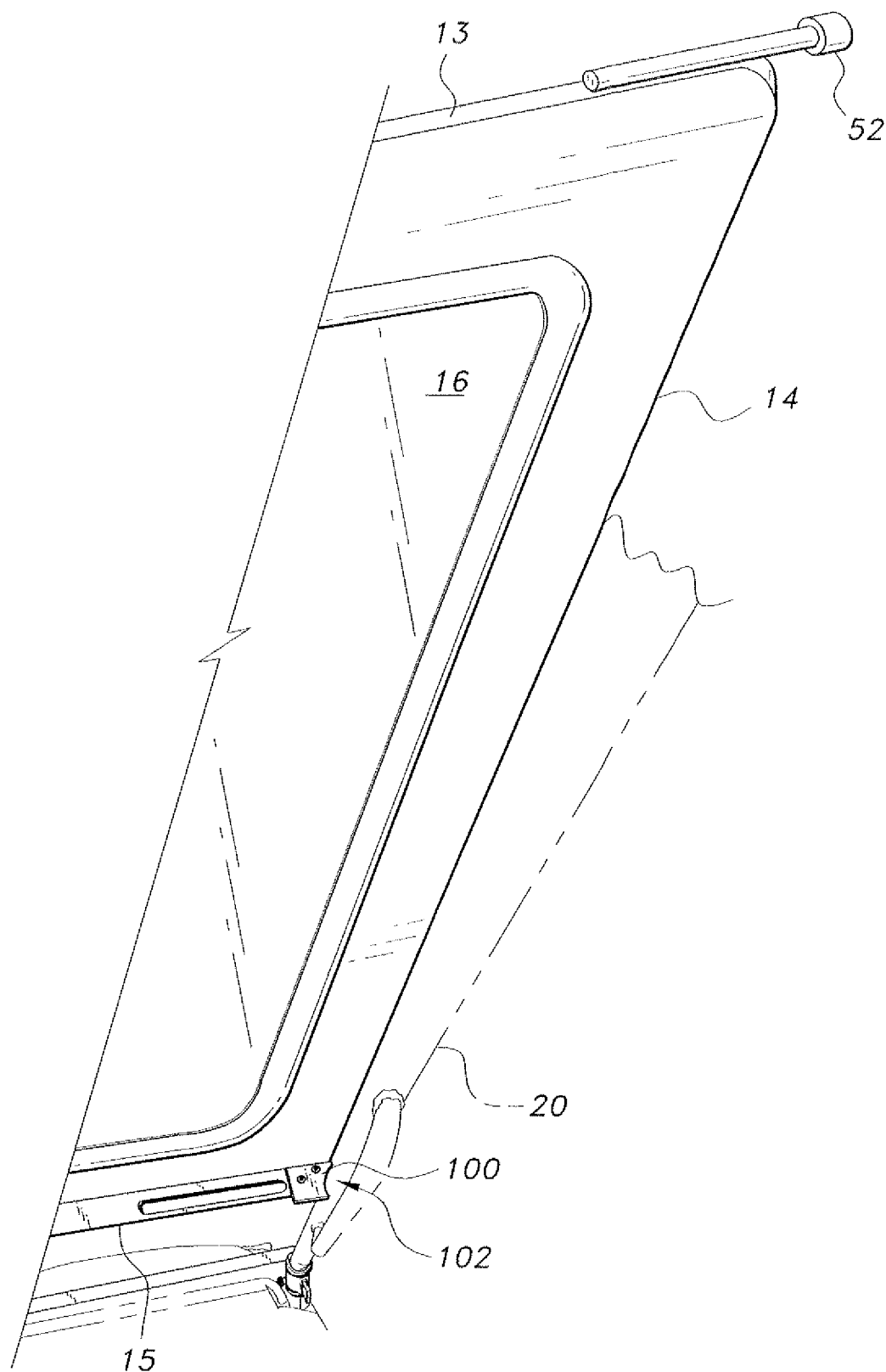
FIG. 6 is a rear perspective view illustrating a windshield frame of the vehicle roof with a retractable windshield.

As shown in FIG. 5, at least one clamp 50, bracket, or the like is secured to a front edge 25 of the roof base 26 for releasably grasping front ends of side tracks 104 when the cover 22 is in the closed position of FIG. 1. This provides releasable locking and securement of the cover 22 to the roof base 26 when roof base 26 is in the lowered or closed position. As best shown in FIG. 6, a pair of guide brackets 100, each having a circular recess 102 for sliding against the side roll bars 20, are preferably fixed to the lower edge 15 of the windshield frame 14. Additionally, as best shown in FIG. 1, the front edge of the cover 22 preferably forms an overhang 24 so that when the cover 22 is lowered and the windshield 16 is deployed, the overhang 24 provides additional securement for the upper edge 13 of the windshield frame 14.

As best shown in FIG. 1, a windshield support base 18 is preferably mounted on the hood of the vehicle 12 adjacent the front frame 20. An upper end of the windshield support base 18 releasably supports the lower edge 15 of the windshield frame 14 when the windshield 16 is deployed. As shown in Figs, 5 and 6, the lower edge 15 of the windshield frame 14 preferably includes at least one engaging member 54 or any other suitable type of engaging member for releasable attachment to the upper end of the windshield support base 18 when the windshield 16 is in the deployed state. Preferably, at least one recess or aperture is formed in the upper end of the windshield support base 18 for receiving the at least one engaging member 54.

Additionally, at least one block 40 is preferably mounted on the upper surface of the roof base 26 adjacent the rear edge 27 thereof As shown in FIG. 3, a groove 42 is formed in an upper surface of the at least one block 40 for releasably receiving the upper edge 13 of the windshield frame 14 when the windshield frame 14 is stowed within the storage compartment 60, thus holding the frame 14 and windshield 16 in place within the storage compartment 60 when not in use. When in the stowed position, the windshield frame 14 and the windshield 16 are prevented from movement by engagement with the at least one block 40 and the lowering of the cover 22.

It is to be understood that the present invention is not limited to the embodiments described above, but encompasses any and all embodiments within the scope of the following claims.

I claim:

1. A vehicle roof with a retractable windshield, comprising:
    a roof base adapted for mounting on a vehicle;
    a cover adapted for mounting on the roof base, the base and the cover defining a storage compartment therebetween, the cover having a rear edge pivotally attached to the roof base, the cover pivoting between an open position and a closed position;
    means for selectively supporting the cover when the cover is pivoted to the open position; and
    a windshield slidably and removably disposed within the storage compartment defined between the cover and the roof base;
    whereby the windshield may be stowed within the storage compartment when the cover is in the closed position, the windshield being slidable out of the storage compartment and supported by the vehicle for use as a windshield when the cover is raised to the open position.

2. The vehicle roof with a retractable windshield as recited in claim 1, further comprising at least one hinge pivotally attaching the rear edge of said cover to said roof base.

3. The vehicle roof with a retractable windshield as recited in claim 1, wherein said means for selectively supporting said cover in the open position comprises at least one pneumatic cylinder attached to said roof base and to said cover.

4. The vehicle roof with a retractable windshield as recited in claim 3, wherein the at least one pneumatic cylinder is pivotally attached to said roof base and to the said cover.

5. The vehicle roof with a retractable windshield as recited in claim 1, further comprising a frame, the windshield being mounted within the frame.

6. The vehicle roof with a retractable windshield as recited in claim 5, wherein the frame has an upper edge and a lower edge, the upper edge having at least one roller rotatably mounted thereto for selective rolling engagement with said cover.

7. The vehicle roof with a retractable windshield as recited in claim 6, further comprising at least one track mounted to an inner surface of said cover for receiving and guiding the at least one roller.

8. The vehicle roof with a retractable windshield as recited in claim 7, further comprising means for selectively securing a front end of the at least one track to said roof base.

9. The vehicle roof with a retractable windshield as recited in claim 8, further comprising a windshield support base adapted for mounting on a hood of the vehicle, the windshield support base releasably contacting and supporting the frame when the windshield is deployed.

10. The vehicle roof with a retractable windshield as recited in claim 9, further comprising means for releasably securing the lower edge of the frame to the upper edge of the windshield support base.

11. The vehicle roof with a retractable windshield as recited in claim 10, wherein said means for selectively securing the front end of the at least one track to said roof base comprises at least one clamp mounted to a front edge of said roof base.

12. The vehicle roof with a retractable windshield as recited in claim 11, further comprising means for releasably securing the frame within the storage compartment when the windshield is stowed therein.

13. The vehicle roof with a retractable windshield as recited in claim 12, wherein said means for releasably securing the frame within the storage compartment comprises at least one block mounted on said roof base, the at least one block having a groove formed in an upper surface thereof for releasably receiving the frame.

14. A vehicle roof with a retractable windshield, comprising:
    a roof base adapted for mounting on a vehicle;
    a cover pivotally attached to the roof base, the cover pivoting between a closed position substantially parallel to the base and an open position, the cover and the base defining a storage compartment therebetween when the cover is in the closed position;

means for selectively supporting the cover in an open position;

an open windshield frame having opposed upper and lower edges; and a windshield mounted in the windshield frame, the windshield and the windshield frame being slidably and removably disposed within the storage compartment, the windshield frame and windshield being slidable from the storage compartment and supportable on the vehicle for use as a windshield when the cover is in the open position.

15. The vehicle roof with a retractable windshield as recited in claim 14, wherein said means for selectively supporting said cover in the open position comprises at least one pneumatic cylinder extending between said roof base and said cover.

16. The vehicle roof with a retractable windshield as recited in claim 15, wherein the at least one pneumatic cylinder is pivotally attached to said roof base and to said cover.

17. The vehicle roof with a retractable windshield as recited in claim 16, further comprising at least one roller rotatably mounted to said windshield frame and selectively rolling against said cover.

18. The vehicle roof with a retractable windshield as recited in claim 17, further comprising means for releasable locking of said roof base to said cover.

19. The vehicle roof with a retractable windshield as recited in claim 18, further comprising a windshield support base adapted for mounting on a hood of the vehicle, an upper edge of the windshield support base releasably supporting the lower edge of the frame when the windshield is deployed.

20. The vehicle roof with a retractable windshield as recited in claim 19, further comprising means for releasably securing the lower edge of the frame to the upper edge of the windshield support base.

\* \* \* \* \*